United States Patent
Mitchell et al.

(10) Patent No.: US 6,597,643 B1
(45) Date of Patent: Jul. 22, 2003

(54) OPTICAL DISC PLAYER

(75) Inventors: David T. Mitchell, Southampton (GB); Stephen D. Bleakley, Southampton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/534,211

(22) Filed: Mar. 24, 2000

(30) Foreign Application Priority Data

Mar. 25, 1999 (GB) .............................................. 9906762

(51) Int. Cl.[7] .............................................. G11B 7/00
(52) U.S. Cl. .............................. 369/44.27; 369/53.37; 369/53.23
(58) Field of Search .............................. 369/44.29, 47.1, 369/53.22, 44.27, 44.35, 53.2, 53.37, 94, 47.23

(56) References Cited

U.S. PATENT DOCUMENTS

| | | | |
|---|---|---|---|
| 5,726,961 A | 3/1998 | Yanagawa | 369/44.31 |
| 5,745,451 A | 4/1998 | Mukawa et al. | 369/44.29 |
| 5,835,466 A | 11/1998 | Shimoda | 369/54 |
| 5,903,531 A * | 5/1999 | Satoh et al. | 369/44.29 |
| 6,016,301 A * | 1/2000 | Takasawa et al. | 369/112.17 |
| 6,249,499 B1 * | 6/2001 | Andoh | 369/47.1 |
| 6,252,834 B1 * | 6/2001 | Kumagai | 369/116 |
| 6,262,957 B1 * | 7/2001 | Inoue et al. | 369/53.22 |
| 6,320,840 B1 * | 11/2001 | Oh et al. | 369/94 |

FOREIGN PATENT DOCUMENTS

| | | | |
|---|---|---|---|
| EP | 0789354 A2 | 8/1997 | G11B/7/125 |
| EP | 0874356 A2 | 10/1998 | G11B/7/00 |
| EP | 0910079 A1 | 4/1999 | G11B/19/12 |
| JP | 3181062 A | 8/1991 | G11B/17/32 |
| JP | 464925 A | 2/1992 | G11B/7/00 |
| JP | 4123320 A | 4/1992 | G11B/7/09 |
| JP | 09219056 A | 8/1997 | G11B/19/12 |
| JP | 10097729 A | 4/1998 | G11B/7/135 |

* cited by examiner

*Primary Examiner*—Thang V. Tran
*Assistant Examiner*—Bach Vuong
(74) *Attorney, Agent, or Firm*—Michael E. Belk

(57) ABSTRACT

A method of detecting the type of optical disc inserted in an optical disc player including the steps of:

Figure 1:
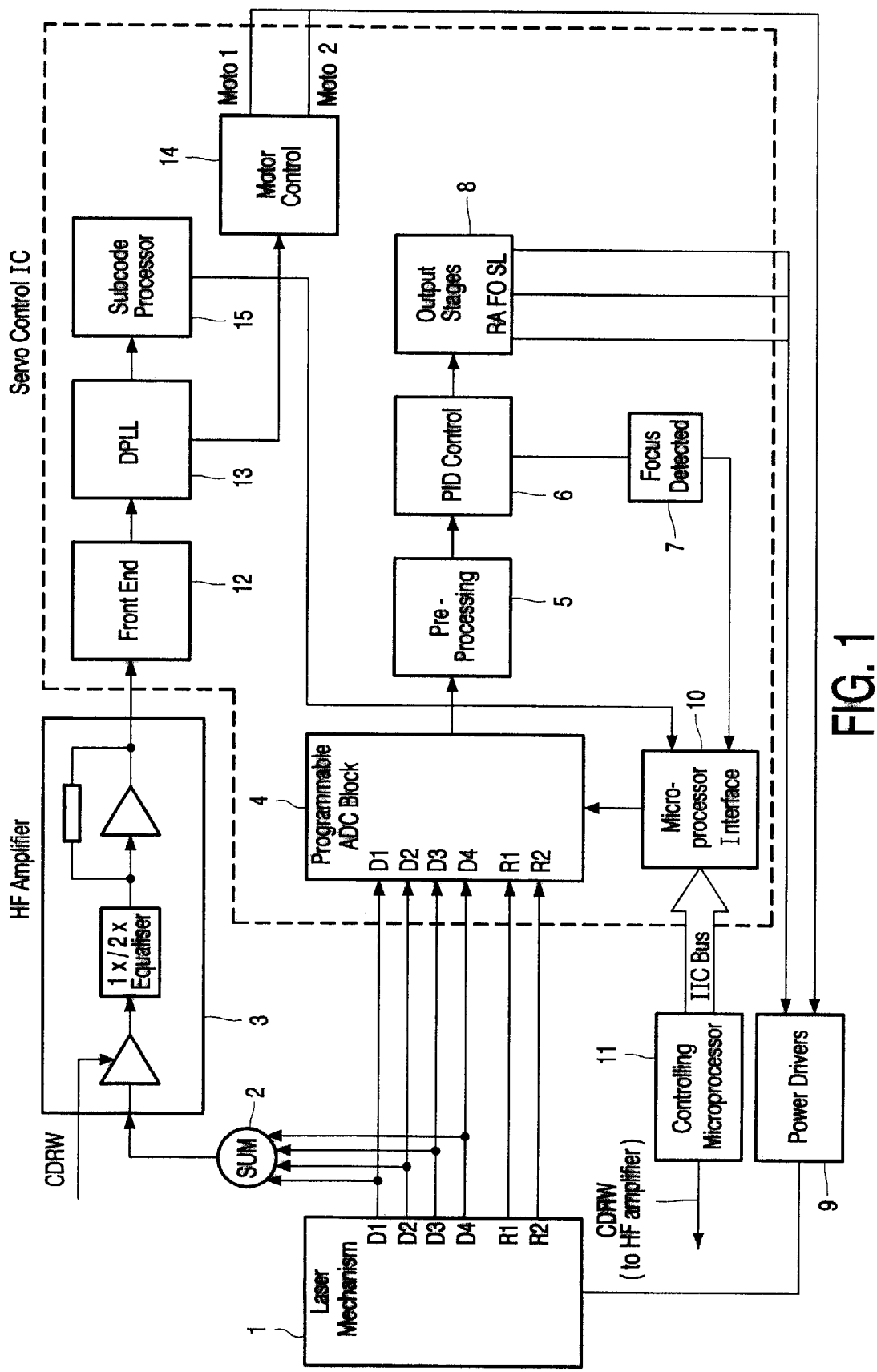

i) attempting to focus a laser read head on the disc using a first set of player parameters appropriate for a first type of disc;

ii) if focus is obtained:
   a) reading data from the disc and determining whether a sub-code representative of a second type of disc is present;
   b) if so changing the first set of player parameters to a second set of player parameters appropriate to a second type of disc;
   c) if not playing or indicating the presence of the first type of disc;

iii) if focus is not obtained changing the first set of player parameters to the second set of player parameters;

iv) if focus is then found playing or indicating the presence of the second type of disc.

13 Claims, 2 Drawing Sheets

OPTICAL DISC PLAYER

The invention relates to an optical disc player and to a method of detecting different types of optical disc inserted into the player.

Various types of optical discs are known which have been developed according to different standards for the recording and/or replay of data. This data may represent audio or video signals or may be pure data. High reflectivity discs, which may typically be CD Audio, CDROM, DVD, or CD recordable, often referred to as write once read many (WORM), generally produce a reflected signal which is of relatively large amplitude. Re-recordable discs, which may typically be CD-RW or CDRAM, however, generally have a lower reflectivity and consequently the reflected signal will have a lower amplitude. As a result, in order to optimise the decoding of the data on the discs it is desirable to provide different parameters for the detection circuits within the player for the different types of disc.

Generally optical disc players are set to focus on a high reflectivity disc and if focus is not found, that is the reflected signal does not reach a preset threshold level, then the player parameters are changed on the assumption that a low reflectivity disc is present. An attempt is then made to focus using parameters appropriate to a low reflectivity disc. If focus is still not found an indication is given that no playable disc is present. This procedure has been published in EP-A-0789354 and is satisfactory provided that the player does not focus on a low reflectivity disc when using parameters appropriate for high reflectivity discs. Initial focussing is generally attempted when the disc is stationary in the player. It has been discovered that under these comparatively ideal conditions some nominally low reflectivity discs may allow focus to be achieved since the detected reflected signal may marginally exceed the threshold value set. When, however, the disc is rotated there is then insufficient noise margin to allow the data to be reliably read from the disc particularly when jumps from one radial position to another are performed. In addition the rotation of the disc is controlled by a digital phase locked loop (DPLL) working on the data read from the disc and if the data is not read correctly the DPLL may lose phase or frequency lock resulting in the spinning out of control.

In this specification non-recordable discs include high reflectivity WORM type discs in addition to those which are preformed and unable to record any data.

It is an object of the invention to enable the provision of an optical disc player that is able to discriminate more reliably between different types of disc so that it can more reliably read data from different types of disc.

The invention provides a method of detecting the type of optical disc inserted in an optical disc player comprising the steps of;
  i) attempting to focus a laser read head on the disc using a first set of player parameters appropriate for a first type of disc,
  ii) if focus is obtained
    a) reading data from the disc and determining whether a sub-code representative of a second type of disc is present,
    b) if so changing the first set of player parameters to a second set of player parameters appropriate to a second type of disc,
    c) if not playing or indicating the presence of the first type of disc,
  iii) if focus is not obtained changing the first set of player parameters to said second set of player parameters,
  iv) if focus is then found playing or indicating the presence of the second type of disc.

By attempting to read data which is only present on re-recordable discs, hereinafter referred to as read-write discs it can be ensured that read-write discs are read using player parameters appropriate to lower reflectivity discs regardless of whether the player was able to initially focus on the disc using the parameters appropriate for high reflectivity non-recordable discs. This has the advantage that read-write discs of comparatively high reflectivity, but not as high as non-recordable discs, can be reliably identified and the player optimised for their playback rather than attempting to use the wrong set of parameters merely because focus was originally found. An alternative solution would have been to increase the threshold required for obtaining focussing of high reflectivity non-recordable discs but this would have the disadvantage of possible failure to focus on lower reflectivity non-recordable discs.

Step ii) a) may be performed by reading a table of contents and determining whether mode 5 sub-code is present in the Q sub-code channel. Read-write discs conforming with part 3 of the Orange Book Standard contain a mode 5 sub-code and in this way relatively high reflectivity read-write discs on which the player may be able to focus when the disc is stationary but where it may lose focus when the disc is spinning or when the read head jumps from one position to another across a plurality of tracks can be identified. The appropriate measures can then be taken to alter the player parameters to more reliably maintain focus and read the data The method may further comprise when focus is found in step iv) the steps of;
  vi) reading data from the disc, and
  vii) determining whether mode 5 sub-code is present before indicating the presence of the second type of disc.

In this way it can be ensured that it is a recordable disc being played rather than a low reflectivity non-recordable disc.

If focus is not found in step iv) then the method may further comprise the step of;
  v) indicating that no playable disc is present.

The player parameters may comprise the gain of an amplifier forming part of a data tracking loop and/or a sensitivity control for processing individual diode outputs from the read head.

The invention further provides an optical disc player capable of detecting the type of disc loaded in the player comprising means for setting a first set of player parameters appropriate for playing discs of a first type, means for focussing the read head on the disc, means for reading data from the disc, means for processing the data and detecting the presence of a sub-code representative of a second type of disc, means for setting a second set of player parameters appropriate for playing a disc of a second type if the sub-code is present, and means for setting the second set of parameters if focus is not found using said first set of parameters.

The optical disc player may further comprise means for indicating that no readable disc is present if focus is not obtained using either the first or second set of parameters.

The sub code representative of the second type of disc may be a mode 5 sub-code in the Q sub-code channel. Such sub-codes are always present in CD-RW discs conforming with part 3 of the Orange Book Standard and serve as a means of detecting the presence of such discs regardless of whether their reflectivity is sufficiently high that the player can focus on them using parameters optimised for high reflectivity CD Audio or CDROM discs.

The gain of a high frequency amplifier which amplifies the sum of the diode outputs from the read head may be increased for low reflectivity read-write discs. Alternatively or in addition the sensitivity of an analogue to digital converter block to which individual diode outputs are applied may be increased for low reflectivity recordable discs.

Figure 2:
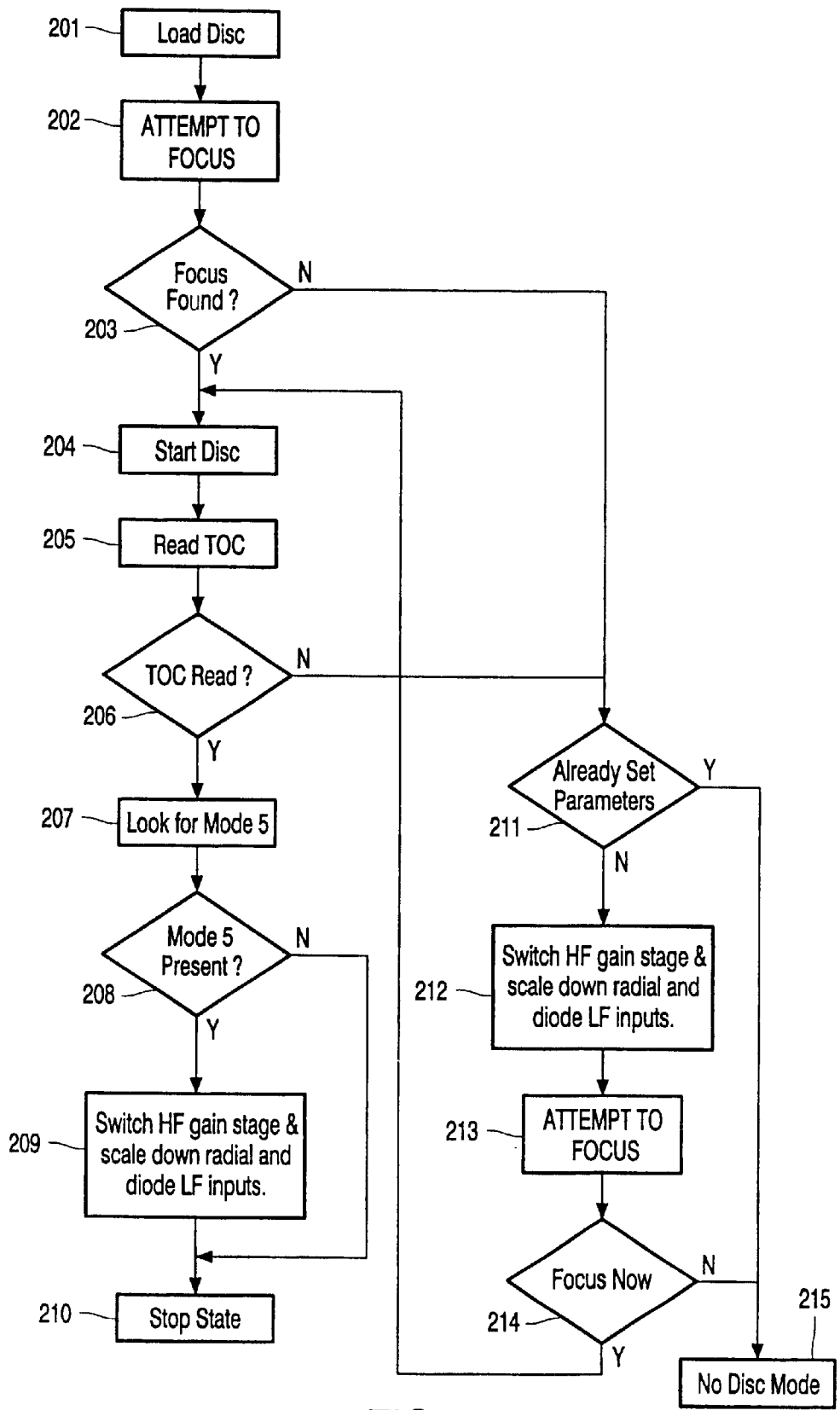

The above and other features and advantages of the invention will become apparent from the following description, by way of example, of embodiments of the invention with reference to the accompanying drawings, in which;

FIG. 1 shows in block schematic form the servo control system of an optical disc player which incorporate the invention, and FIG. 2 is a flow diagram illustrating a method according to the invention.

As shown in FIG. 1 the servo control system for an optical disc player according to one embodiment of the invention comprises a conventional laser mechanism 1 which contains an illuminating laser and associated optics for focussing the laser on the information surface of an optical disc. The laser mechanism 1 also includes appropriate detectors for detecting the radiation reflected from the disc in order to produce signals representing the data and indicating tracking of the information tracks. Also included is a motor for rotating the disc, means for focussing the laser radiation on selected portions of the disc under control of signals generated within the servo control system, and means for moving the reading head radially across the disc.

Four outputs D1–D4 from the laser mechanism 1 are summed in a summer 2 and fed to a high frequency amplifier 3. The four outputs D1–D4 together with two further outputs R1 and R2 are fed to an analogue to digital converter block 4, the output of which is passed to a pre-processing block 5 and then to a PID controller 6. A first output of the PID controller 6 is fed to a focus detector 7, while a second output is fed to an output stage 8 which produces outputs to control the focussing of the laser on the disc (FO), the fine radial positioning of the laser head on the disc (RA), and the sledge position (SL) which provides a coarse positioning of the read head with respect to tracks on the disc. The three outputs of the output stage 8 are fed through power amplifiers 9 to the laser mechanism 1. The output of the focus detector 7 is fed via an interface 10 to a controlling microprocessor 11.

The output of the amplifier 3 is fed to a front end circuit 12 which slices and converts the signal so that it is in the required form for application to a digital phase locked loop (DPLL) 13, an output of which is fed to a motor control circuit 14 which controls the speed of the spindle motor to cause the disc to be rotated at the desired speed for correct reading of the data from the disc. The output of the motor control circuit is fed through the power amplifiers 9 to the spindle drive motor. The controlling microprocessor produces a signal CDRW that is arranged to vary the gain of the amplifier 3 according to whether a disc having high reflectivity, that is a CD Audio, CDROM, DVD, or the like, or a disc having a low reflectivity, that is a CD-RW, CDRAM, or the like. Thus the gain of the amplifier is increased when a low reflectivity disc is being played as the received signal will have a lower amplitude than one received from a high reflectivity disc. In addition the microcontroller 11 increases the sensitivity of the analogue to digital converter block 4 to compensate for the lower levels of the signals D1–D4, R1, and R2. Thus far the servo control system is conventional and is constructed from well known circuit elements used in optical disc players.

The servo control system also includes a sub-code processor 15 that receives data read from the disc via the DPLL 13 and inspects this data for the presence of particular sub-codes. As set forth in part 3 of the Orange Book Standard for CD-RW discs lead in information is encoded in the Sub-code Q channel. For CD-RW discs sub-code mode 5 is always present. By detecting this sub-code, the player is able to distinguish between high reflectivity non-recordable discs and read-write discs having a comparatively high reflectivity which may be sufficient to enable a focus indication to be achieved even when a CD-RW disc is inserted in the player. This, of course, would not be necessary if the data from the CD-RW disc could be reliably read using the parameters suitable for non-recordable discs. It is found, however, that while it may be possible to focus on the disc when it is stationary, focus may be lost when the disc starts spinning or when the reading head jumps from one radial position to another. During this process it is necessary to maintain focus in order to count the track crossings so that the final position can be determined. If the mode 5 sub-code is present the sub-code processor sends a signal to the control processor 11 via the interface 10. This signal causes the control processor 11 to produce an output CDRW that is fed to the amplifier 3 to increase its gain. In addition the control microprocessor will adjust the sensitivity of the analogue to digital converter block 4 via the interface 10. As a result even if focus is detected using parameters appropriate for a high reflectivity disc the parameters can be reset on detection of the mode 5 sub-code to those appropriate for a low reflectivity CD-RW disc.

FIG. 2 is a flow diagram illustrating a method according to the invention for identifying the type of disc loaded into an optical disc player. As shown in FIG. 2 the method starts, step 201, with the insertion of a disc into the player. The next step of the method, step 202, is to attempt to focus the laser beam on the disc using parameters appropriate for high reflectivity non-recordable discs. A check is then made, decision 203, as to whether focus has been attained by determining whether the reflected signal reaches a preset threshold value. If, at step 203, focus is obtained the disc is then started, that is the spindle motor is started to rotate the disc, step 204. An attempt is then made to read the table of contents, step 205. A check is then made, decision 206, as to whether the table of contents has been read and, if so, then the sub-code Q channel is examined to look for mode 5 sub-code identifying a CD-RW disc. A check is then made to determine whether mode 5 is present, decision 208. If so, then the parameters are changed to those appropriate to CD-RW or other relatively low reflectivity discs, step 209. Thus the gain of amplifier 3 is increased and the sensitivity of the analogue to digital converter block 4 is increased. The procedure then ends, step 210. If the mode 5 sub-code is not detected then it is assumed that a high reflectivity disc is present and the initial parameters are retained.

If, at step 203, focus is not obtained then a check is made as to whether the parameters have been changed to those appropriate for low reflectivity discs, decision 211. If not then the parameters are then changed, step 212, and a further attempt to obtain focus is made, step 213. If the attempt is now successful, decision 214, the procedure reverts to the input of step 204 and the disc is started and an attempt is made to read the table of contents and identify the mode 5 sub-code.

If it is not possible to read the table of contents, output NO of decision 206, then the process branches to the input of decision 211 where it is decided whether the parameters have already been changed to those appropriate to low reflectivity discs. If the parameters have been changed, output YES of decision 211, then an indication that no readable disc is present is generated, step 215. Further if focus can not be obtained after the parameters have been changed to those appropriate to low reflectivity discs, output NO of decision 214, then the procedure goes to step 215 and an indication that no readable disc is present is made.

It will be apparent from the foregoing that by monitoring the table of contents to detect whether mode 5 sub-code is present it can be ensured that a CD-RW disc is detected and the player parameters can be modified to reliably read the data from the disc. Other codes may be applicable to other forms of low reflectivity discs according to standards other than that set forth in the Orange Book Standard. In general any code which identifies the disc as being of relatively low reflectivity can be identified by appropriate decoding means and used to check for the presence of such a disc and when found to modify the parameters of the player to optimise reading of the disc. It will be clear that this method is particularly advantageous for identifying discs which are marginally above the reflectivity necessary to obtain focus when the disc is stationary but not sufficiently above that level to enable focus to be maintained under dynamic condition.

From reading the present disclosure, other modifications will be apparent to persons skilled in the art. Such modifications may involve other features which are already known in the design and use of optical disc players and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of detecting the type of optical disc inserted in an optical disc player comprising:
   i) attempting to focus a laser read head on the disc using a first set of player parameters appropriate for a first type of disc;
   ii) if focus is obtained:
      a) reading data from the disc and determining whether a sub-code representative of a second type of disc is present;
      b) changing the first set of player parameters to a second set of player parameters appropriate to a second type of disc, when the second type of disc is determined;
      c) playing or indicating the presence of the first type of disc, when the second type of disc is not determined;
   iii) if focus is not obtained, changing the first set of player parameters to the second set of player parameters, and attempting to focus using the second set of player parameters; and
   iv) if focus is then found, playing or indicating the presence of the second type of disc.

2. The method of claim 1 in which the reading of data includes reading a table of contents and determining whether a mode 5 sub-code is present in a Q sub-code channel.

3. An optical disc player capable of detecting the type of disc loaded in the player comprising:
   means for setting a first set of player parameters appropriate for playing discs of a first type;
   means for focusing the read head on the disc;
   means for reading data from the disc if focus is found;
   means for processing the data and detecting the presence of a sub-code representative of a second type of disc;
   means for setting a second set of player parameters appropriate for playing a disc of a second type if the sub-code is present; and
   means for setting the second set of parameters if focus is not found when using the first set of parameters.

4. The player of claim 3 further comprising means for indicating that no readable disc is present if focus is not found using either the first or second set of parameters.

5. The method of claim 1 in which if focus is not found using the second set of player parameters then the method further comprises the step of;
   v) indicating that no playable disc is present.

6. The method of claim 1 in which if focus is found using the second set of player parameters then the method further comprises:
   vi) reading data from the disc; and
   vii) determining whether the sub-code representative of the second type of disc is present before indicating the presence of the second type of disc.

7. The method of claim 1 in which the player parameters include the gain of an amplifier forming part of a data-tracking loop.

8. The method of claim 7 in which the player parameters include a sensitivity control for processing individual diode outputs from the read head.

9. The method of claim 1 in which:
   if focus is not found using the second set of player parameters then the method further comprises:
      v) indicating that no playable disc is present;
   if focus is found using the second set of player parameters then the method further comprises:
      vi) reading data from the disc; and
      vii) determining whether the sub-code representative of the second type of disc is present before indicating the presence of the second type of disc;
   the player parameters include the gain of an amplifier forming part of a data-tracking loop; and
   the player parameters include a sensitivity control for processing individual diode outputs from the read head.

10. The player of claim 3 in which the sub code representative of the second type of disc is a mode 5 sub-code in a Q sub-code channel.

11. The player of claim 3 in which the gain of a high frequency amplifier which amplifies the sum of the diode outputs from the read head is increased for low reflectivity recordable discs.

12. The player of claim 3 in which the sensitivity of an analogue to digital converter block to which individual diode outputs are applied is increased for low reflectivity recordable discs.

13. The player of claim 3 in which:
   the sub code representative of the second type of disc is a mode 5 sub-code in a Q sub-code channel;
   the gain of a high frequency amplifier which amplifies the sum of diode outputs from the read head is increased for low reflectivity recordable discs; and
   the sensitivity of an analogue to digital converter block to which individual diode outputs are applied is increased for low reflectivity recordable discs.

* * * * *